Jan. 29, 1974 A. L. KOHL 3,788,953
TURBULENCE PROMOTOR SYSTEM
Filed April 5, 1971
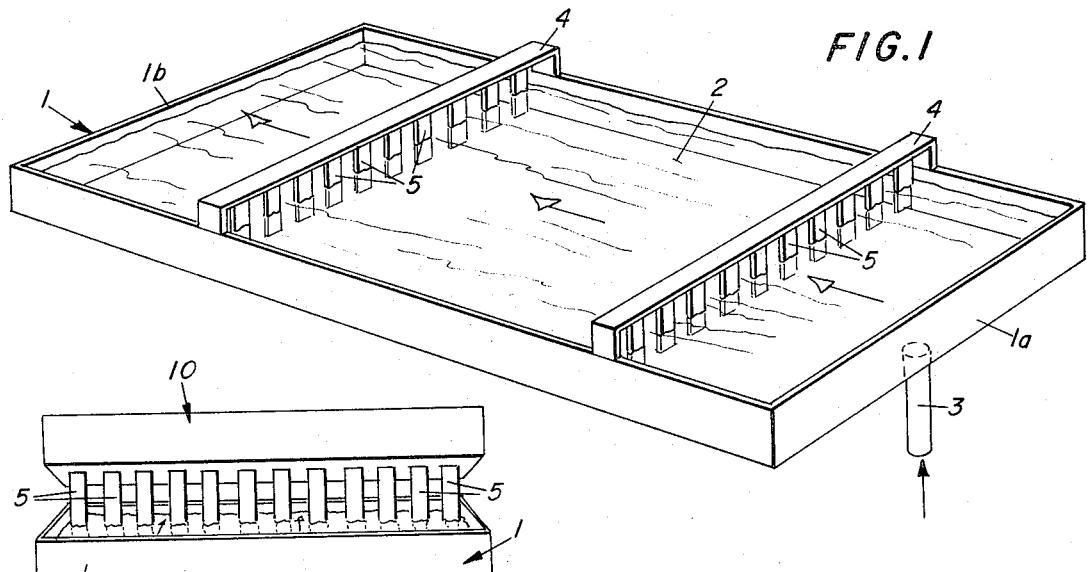
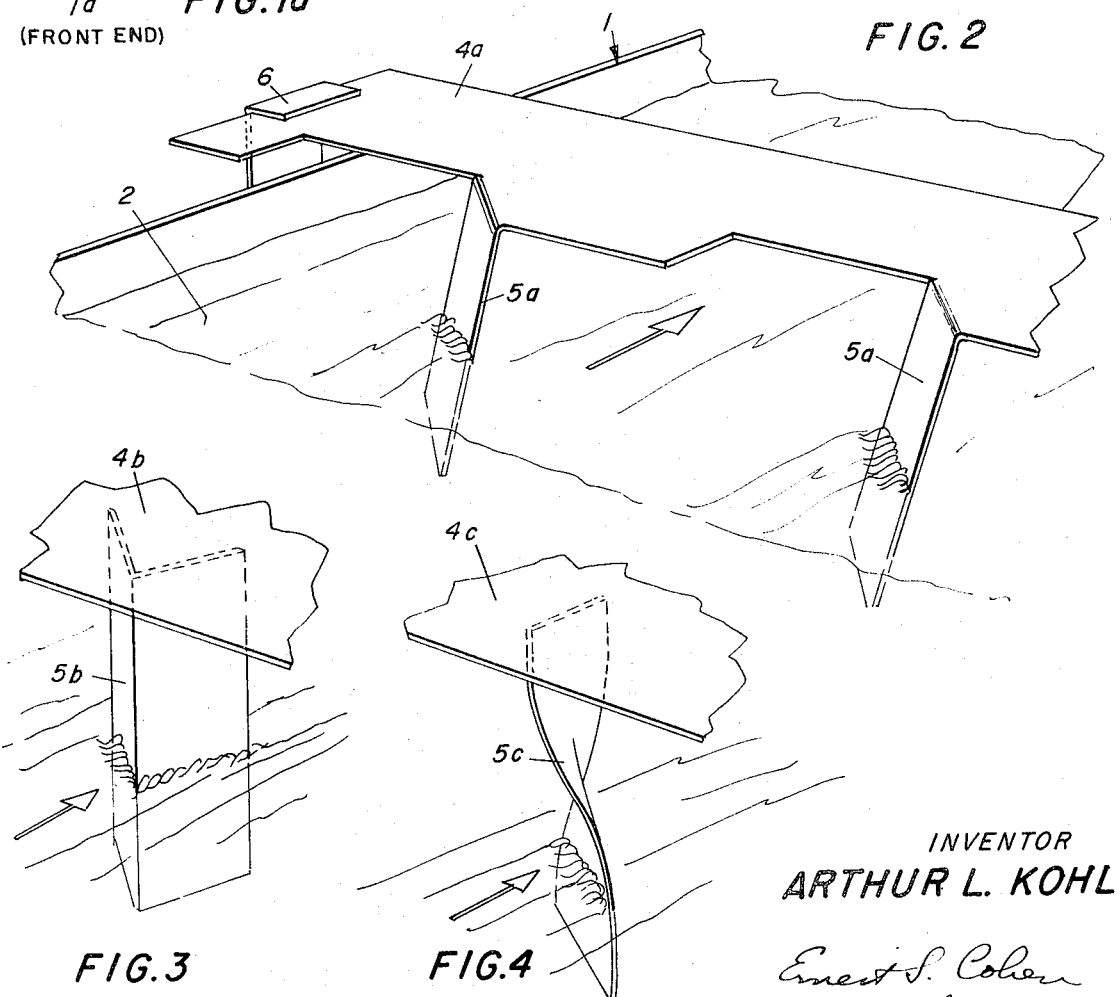
INVENTOR
ARTHUR L. KOHL
BY
ATTORNEYS United States Patent Office 3,788,953
Patented Jan. 29, 1974

3,788,953
TURBULENCE PROMOTOR SYSTEM
Arthur L. Kohl, Woodland Hills, Calif., assignor to the United States of America as represented by the Secretary of the Interior
Filed Apr. 5, 1971, Ser. No. 131,232
Int. Cl. B01d 3/00, 3/02, 3/14
U.S. Cl. 202—173    6 Claims

ABSTRACT OF THE DISCLOSURE

In a direct contact condensation system wherein vapor condenses upon a flowing shallow stream of cooler liquid, the flow of the uppermost layer of the liquid stream is disrupted without disrupting the flow of the main body of the stream so as to agitate and turn over the uppermost layer, and move the uppermost layer downward to a region where the natural turbulence of the flowing stream will further agitate and break up said layer.

---

This invention relates to a distillation system in which vapors are condensed by direct contact condensation on a cooler fluid.

In view of the fact that direct contact condensation optimizes the rate of heat transfer between condensing vapor and condensing medium, there is great interest in the use of such a technique in distillation systems, particularly in the desalination distillation of sea water.

In one mode of operation of direct contact condensation, the cooler fluid, e.g., cooled fresh water, is passed along open channels as a shallow stream of liquid in direct contact with distilled vapors (e.g. steam), which channels are usually horizontally disposed or sloped slightly downward in the direction of flow. U.S. Pats. Nos. 3,515,-645, 3,395,085 and 3,337,419 disclose such a system. In this arrangement the rate at which the steam condenses on the surface of the flowing water is limited by the rate at which heat can be removed from the surface of the water. In the case of water flowing in a smooth channel, the heat is removed from the surface by mixing induced through the natural turbulence of the flowing water. Unfortunately, even when the stream of water is in fully developed turbulent flow, the mixing action at the very top surface is relatively mild compared to that in the body of the water, and a thin film of higher temperature water can exist at the top surface. Contributing to his phenomena is also the fact that the buoyancy of this higher temperature film helps to maintain its position on top of the stream. Such a film obviously adversely affects the heat transfer capabilities of direct contact condensation.

To promote the turbulence of the entire stream of flowing fluid, baffle-like projections and obstructions have been incorporated on the floor of the channel or tray over which the liquid is flowing, as exemplified by U.S. Pat. No. 3,395,085. However, such devices promote turbulence at the expense of pressure drop, which is undesirable in a distillation system. To overcome such pressure drop, it becomes necessary to incline the tray beyond a desirable minimum tilt (about 3–10% slope).

I have now developed a system for breaking up the warmer top liquid film of the flowing condensing medium without adversely affecting the pressure drop of the flowing medium. Generally, my system comprises disrupting the top portion or layer of the flowing shallow liquid stream, e.g., cool fresh water, without impeding the flow of water below the top portion. This is accomplished by a series of liquid flow disrupting projections attached to a suitable support member or members disposed above the flowing liquid, which projections extend downward through the top surface of the liquid but terminate substantially above the floor of the tray or channel over which the stream is flowing. Such projections partially obstruct flow of the top layer of the flowing stream and thereby disrupt such flow and act as plows to turn over the top layer of water as it passes under the device. This serves to expose the cooler bulk of flowing water and to move the warmer top layer down to a region where natural turbulence of the flowing stream can complete the mixing job. In this manner as undesirable film of higher temperature water is prevented from forming on top of the flowing shallow stream. Yet there is no resistance to flow of the main bulk of the stream other than that presented by the smooth tray or channel over which the stream is flowing.

It is therefore an object of the present invention to provide a process and apparatus for optimizing the transfer of heat through the body of cool liquid (i.e., condensing medium) in a direct contact condensation system.

Another object is to disrupt only the uppermost layer of the cool liquid.

A still further object is to provide such an improved system for saline water desalination.

Other objects and advantages will be obvious from the following more detailed description of the invention taken in conjunction with drawings in which FIG. 1 is a perspective view of a flow disruptor apparatus of the present invention;

FIG. 1a is a front perspective view of an alternative embodiment; and

FIGS. 2–4 are perspective views of exemplary individual flow disruptors.

Referring to FIG. 1, therein is shown the preferred general arrangement of the flow disruptors of the present invention. Reference numeral 1 designates one of the plurality of channels or trays in a condensing zone of a distillation system over which tray a shallow stream of cool liquid 2 (i.e., the condensing medium) is flowing in a substantially horizontal direction.

Liquid 2 is introduced onto and removed from the tray in the prior art manner, as, for example, through one or more underfeed conduits 3 near the front end 1a of the tray, and one or more exit conduits (hidden) under the tray near its back end 1b. The vapor to be condensed is conveyed into the condensing zone in the prior art manner to directly contact and condense upon the cooler flowing liquid 2 in tray 1. In a water desalination system the stream of cool liquid 2 (e.g., cool fresh water) may be about ¼ to about 2 inches deep, typically about ¾ inch deep.

Tray or channel 1 can be fabricated from many materials including sheet metal or thin plastic (e.g., polyvinyl fluoride) film supported on wires.

Above the tray and attached thereto or to any other convenient member of the distillation apparatus are at least two elongated flow disruptor support members 4. Emanating from each member 4 and projecting downward therefrom in comb-like fashion are a series of flow disrupting projections 5 which extend through the top surface of the flowing liquid 2 and break up the top, hot film of liquid which would otherwise remain on the flowing liquid. In the case of condensation of steam on cool fresh water, the projections generally should extend into the stream of flowing water a distance of about 10 to 75 percent of the total depth of the stream.

Although the support members 4 are shown in FIG. 1 as parallel to one another and transversely disposed with regard to the flowing stream, many other arrangements are suitable. For example, the members can be angularly displaced relative to one another, and can be positioned relative to the flowing stream in any direction as is convenient. Furthermore, the support means can consist of a unitary piece rather than a plurality of members. An example of this latter arrangement is shown in FIG. 1a in which tray 1 is viewed from its front end 1a. Therein the bottom of condenser tray 10 immediately above tray 1 is employed as the support means for projections 5 extending into tray 1. Some of these projections 5 can be constructed to extend all the way to the floor of tray 1 to provide structural support and proper spacing.

Referring again to FIG. 1, as to the number and spacing of support members 4, and the number and spacing of the flow disruptor projections 5 on each member, these variables are best determined experimentally for each operation. Generally, however, a row of projections on one elongated support member is staggered with regard to a row of projections on an adjacent support member. In other words, any one projection on a support member is aligned, lengthwise of the tray, with the space between two projections on an adjacent support member. This arrangement maximizes flow disruption of the top layer of liquid across the path of the flowing liquid.

Many different designs can be employed for the shape of the individual flow disrupting projections 5, it being only necessary that they turn over the top layer or portion of cooling liquid as it passes under the device, which top layer includes the top higher temperature film which would otherwise remain unaffected by the natural turbulence of the flowing liquid. Any baffle which presents at least one surface upon which the flowing cooling medium can impinge is suitable. Flow disrupting projections of stiff wire or fine screening are also suitable. Exemplary designs are shown in FIGS. 2-4, it being obvious that many other liquid flow disrupting shapes can be employed.

Referring first to FIG. 2, therein is shown an embodiment which minimizes fabrication costs of the flow disrupting projections. Metal or plastic support strip 4a is attached by, for example, a bracket 6 to tray 1 over which water 2 is flowing in a shallow stream. Projections 5a are integral parts of the strip 4a. Each projection is formed by partially cutting a longitudinal segment in the elongated strip, and bending the still-connected segment away from the strip in the direction of water 2. As shown, baffle-like projections 5a are positioned to direct flow to the left. Adjacent support strips (not shown) preferably have baffle-like projections aligned with the spaces between projections 5a of illustrated strip 4a, and the projections of these adjacent strips are preferably positioned to direct flow to the right.

In the embodiment shown in FIG. 3, each projection 5b attached to support 4b is designed in the shape of a V-plow and thereby directs flow to both the right and left.

Referring to FIG. 4, in this embodiment each flow disrupting projection 5c is designed as a twisted strip of, for example, metal or plastic positioned to deflect flow to the left. As in the embodiment of FIG. 2, adjacent support strips would have projections positioned to deflect flow to the right.

What is claimed is:

1. In a direct contact condensation apparatus wherein vapor is directly condensed upon a cooler liquid medium flowing as a shallow stream in an open tray in a substantially horizontal direction through a condenser, and wherein a continuous medium-contacting vapor flow path is provided from one end of said tray to the other, the improvement comprising:
    (a) support means disposed above said tray;
    (b) a plurality of liquid flow disrupting projections connected to and extending downward from said support means through the top portion of said shallow stream and terminating above the bottom portion of said stream; said projections having a face bent in a non-planar form, said face of non-planar form being disposed in the path of liquid flow to partially obstruct the flow of said top portion so as to disrupt the flow of and turn over said obstructed top portion, and move said obstructed top portion downward to a region where the natural turbulence of said flowing stream will agitate and further break up said obstructed top portion; and
    (c) providing an unobstructed flow path across the entire bottom of said tray so as to provide unobstructed flow of the bottom portion of said flowing shallow stream.

2. The apparatus of claim 1 including means to evaporate a distilland to produce said vapor, and means to convey said vapor into said condenser.

3. The apparatus of claim 1 wherein there are a plurality of said trays, one above the other, and wherein the bottom of one of said trays is the support means for the projections extending toward the tray immediately below said one of said trays.

4. The apparatus of claim 1 wherein said support means comprises a plurality of parallel elongated support members transversely disposed across said flowing stream, wherein there are a plurality of said projections along the length of each elongated member, and wherein a projections on any one support member is aligned, lengthwise of said flowing shallow stream, with a space between projections on any adjacent support member.

5. The apparatus of claim 4 wherein said projections on one member deflect flow of said shallow stream to one side of said stream's unobstructed path while projections on an adjacent member deflect flow of said shallow stream to the other side of said stream's unobstructed path.

6. The apparatus of claim 4 wherein each projection deflects flow of said shallow stream to both sides of said stream's unobstructed path.

References Cited

UNITED STATES PATENTS

| | | | |
|---|---|---|---|
| 3,232,847 | 2/1966 | Hoff | 202—173 X |
| 3,337,419 | 8/1967 | Kogan | 202—185 |
| 3,395,085 | 7/1968 | Kogan | 202—173 X |
| 3,515,645 | 6/1970 | Wetch | 202—173 |
| 3,640,850 | 2/1972 | Smith Jr. | 159—2 MS |

FOREIGN PATENTS

| | | | |
|---|---|---|---|
| 2,020,580 | 11/1970 | Germany | 202—173 |
| 1,025,922 | 4/1966 | Great Britain | 202—173 |

JACK SOFER, Primary Examiner

U.S. Cl. X.R.

202—183, 202, 185 A; 203—10; 159—Dig. 17